3,447,697
ARTICLE HANDLING APPARATUS
Woodruff A. Morey, Flossmoor, Richard P. Molt, Olympia Fields, Victor H. Ames, Midlothian, and Edward T. Dolin, Oaklawn, Ill., assignors to Whiting Corporation, a corporation of Illinois
Filed Apr. 4, 1966, Ser. No. 539,923
Int. Cl. B65g 59/02
U.S. Cl. 214—8.5                                   20 Claims

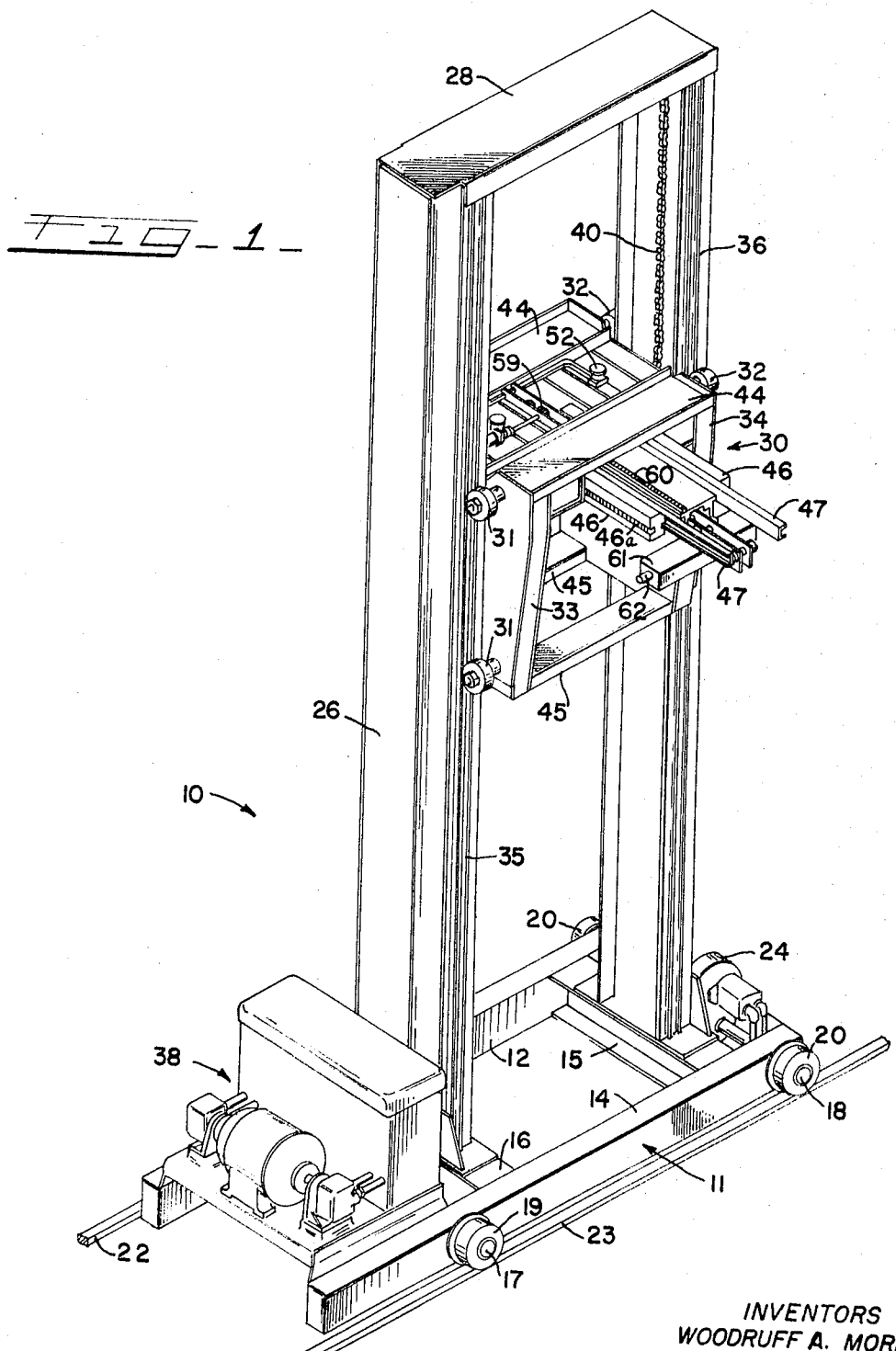

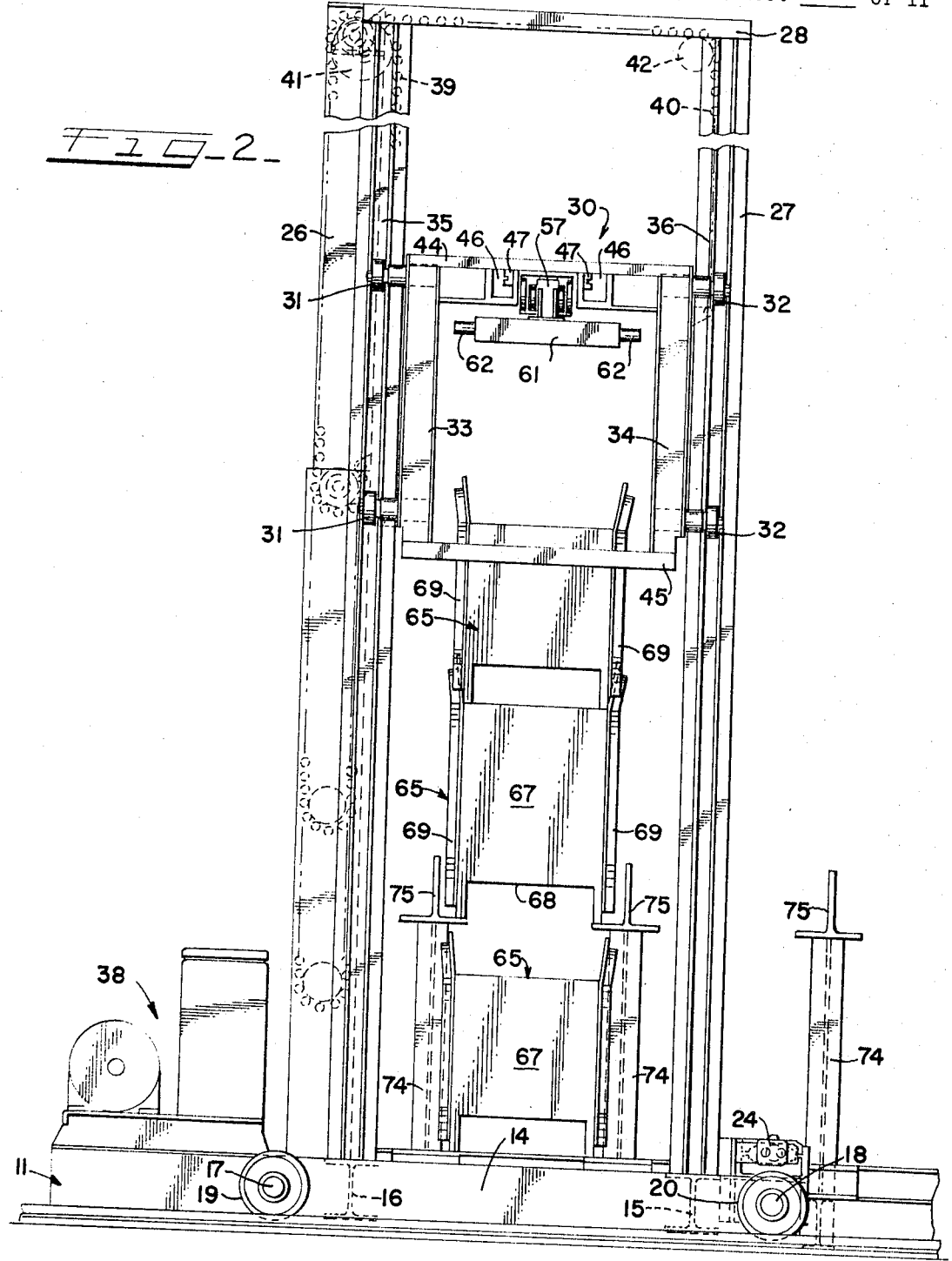

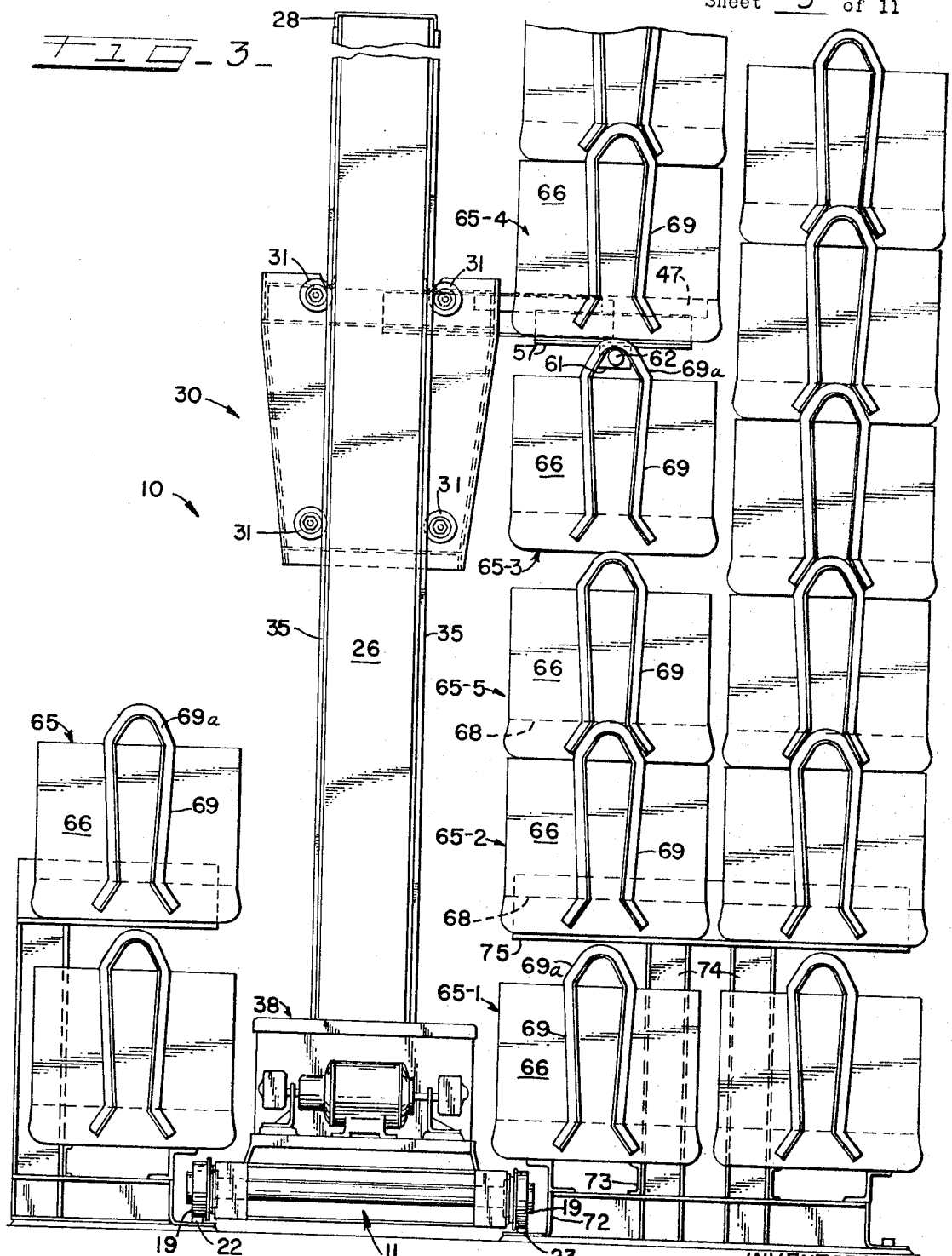

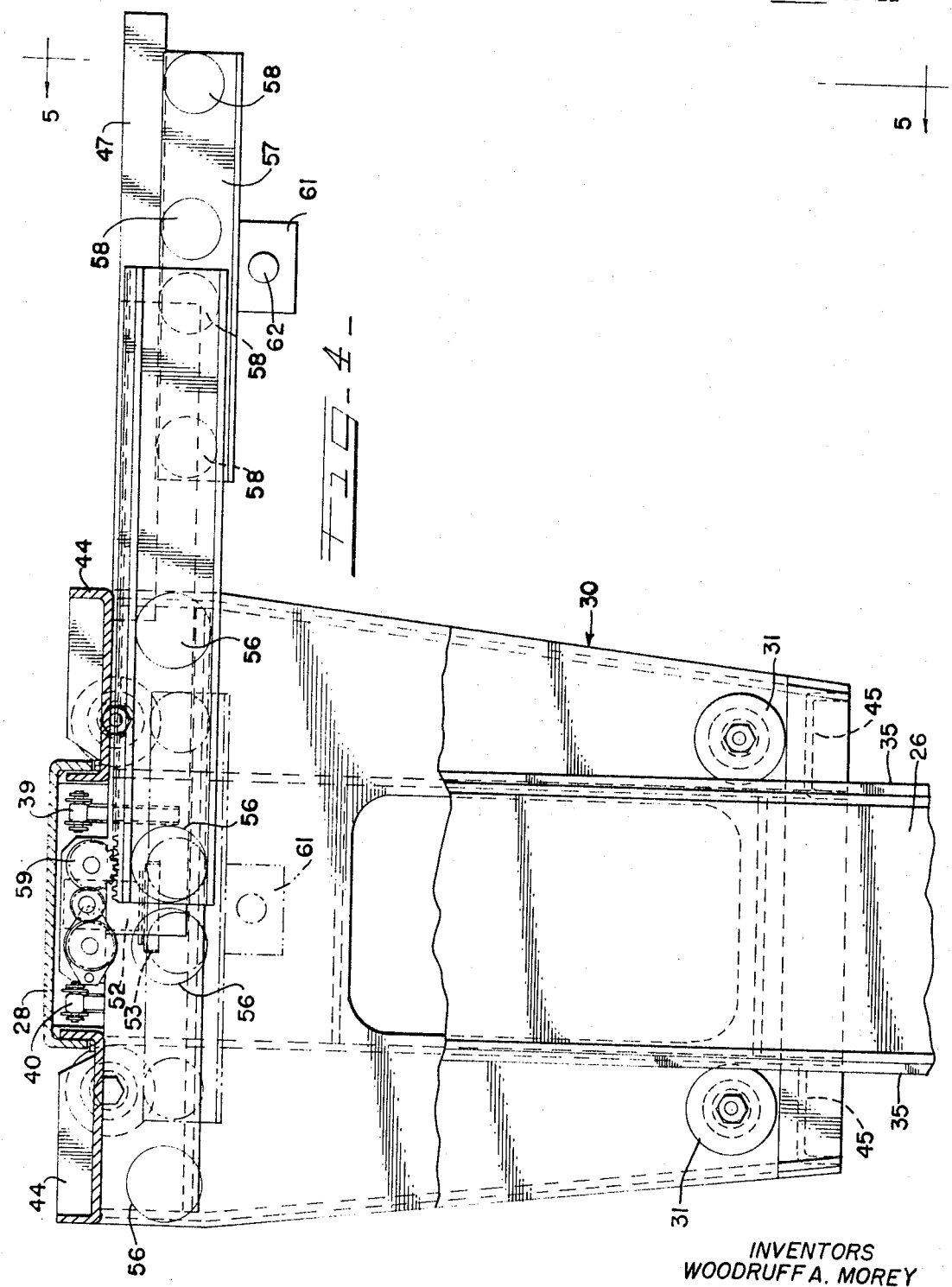

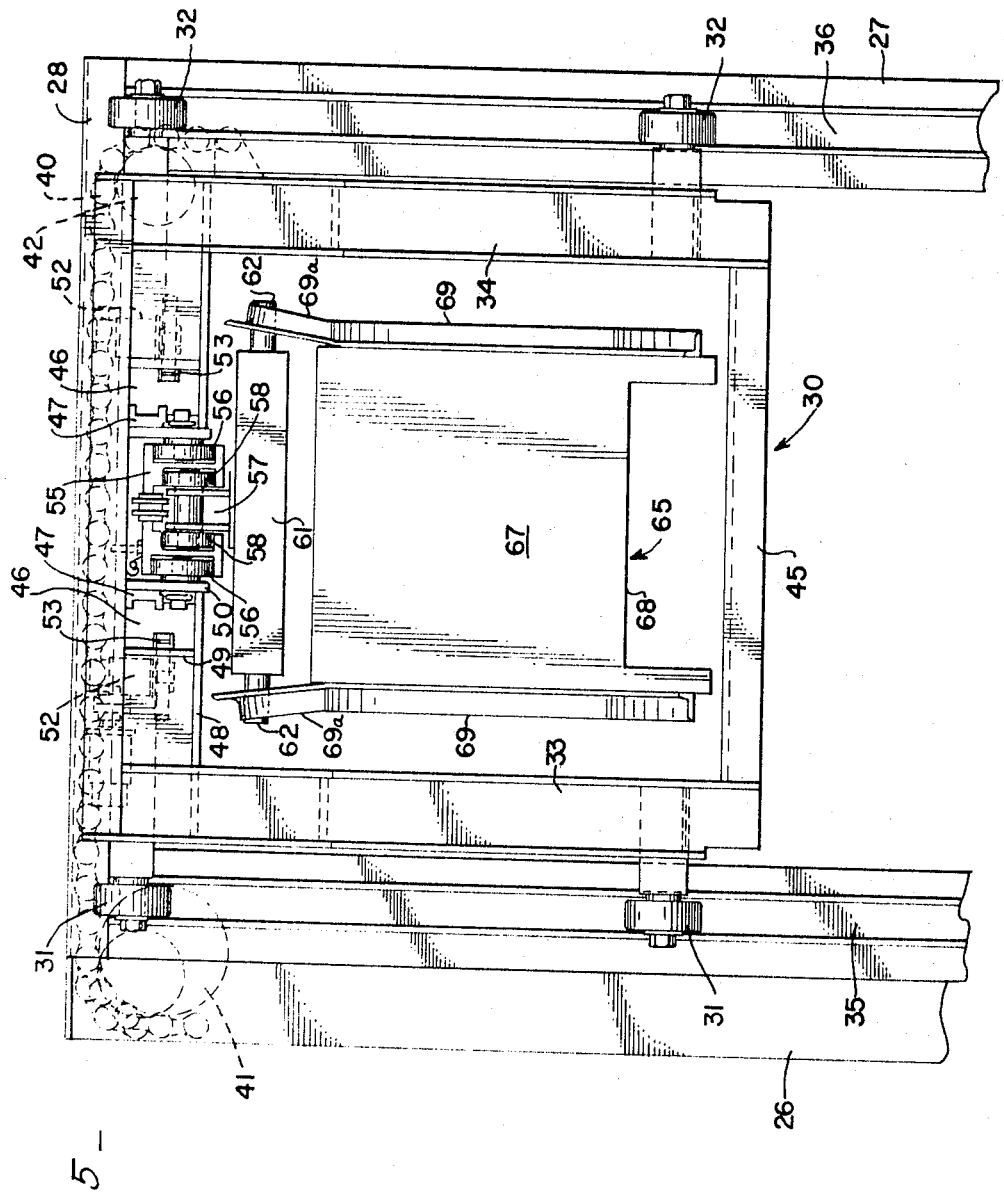

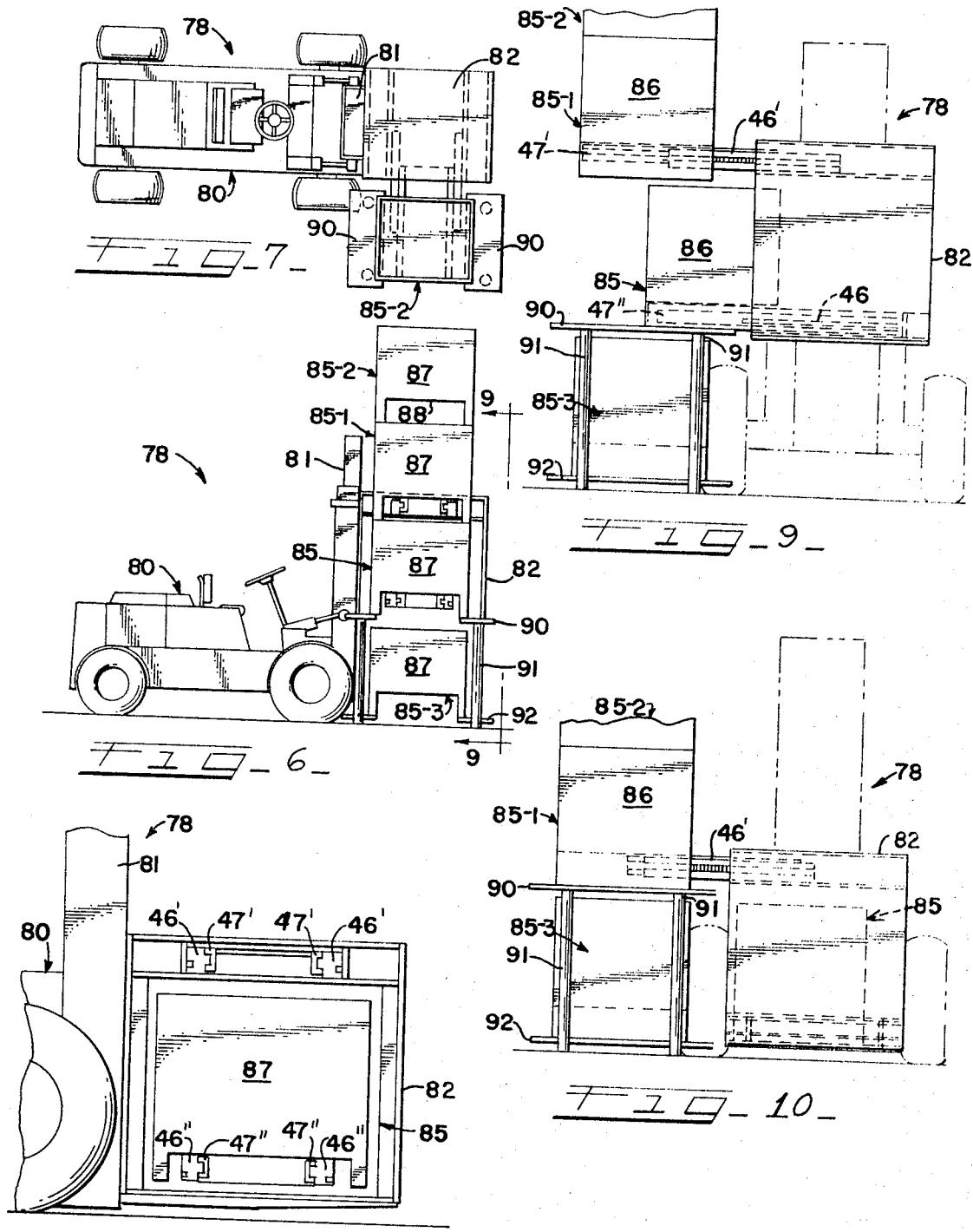

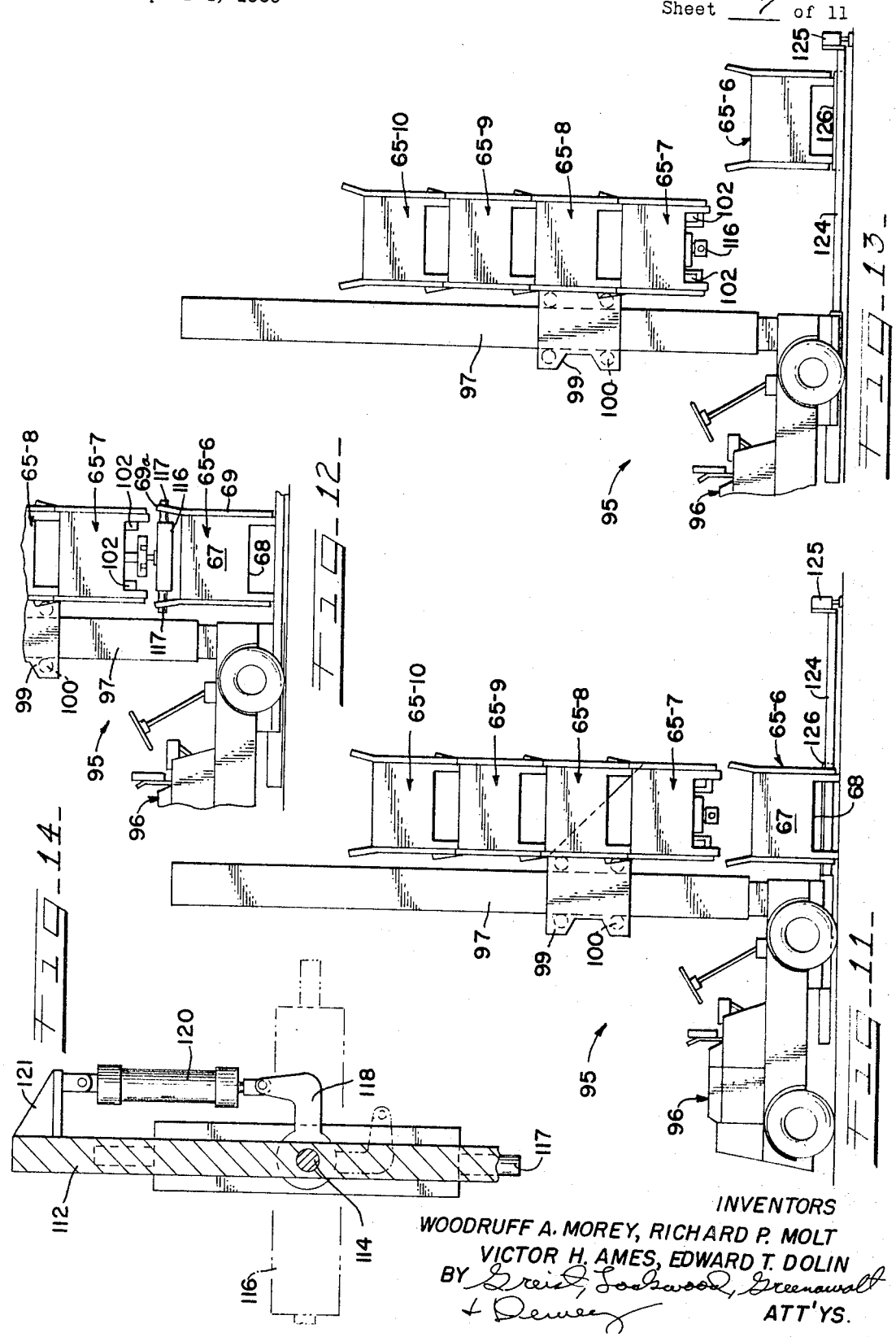

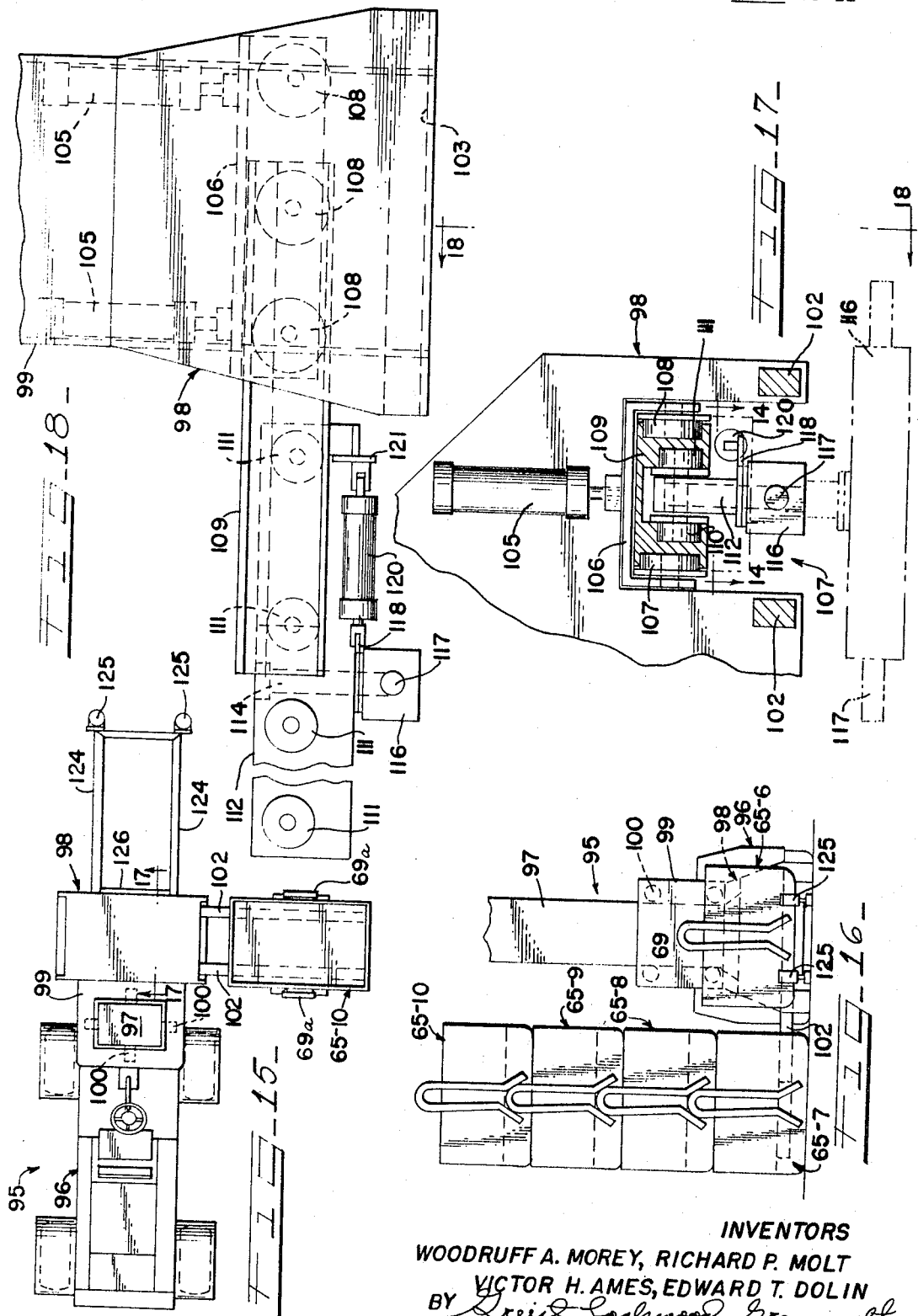

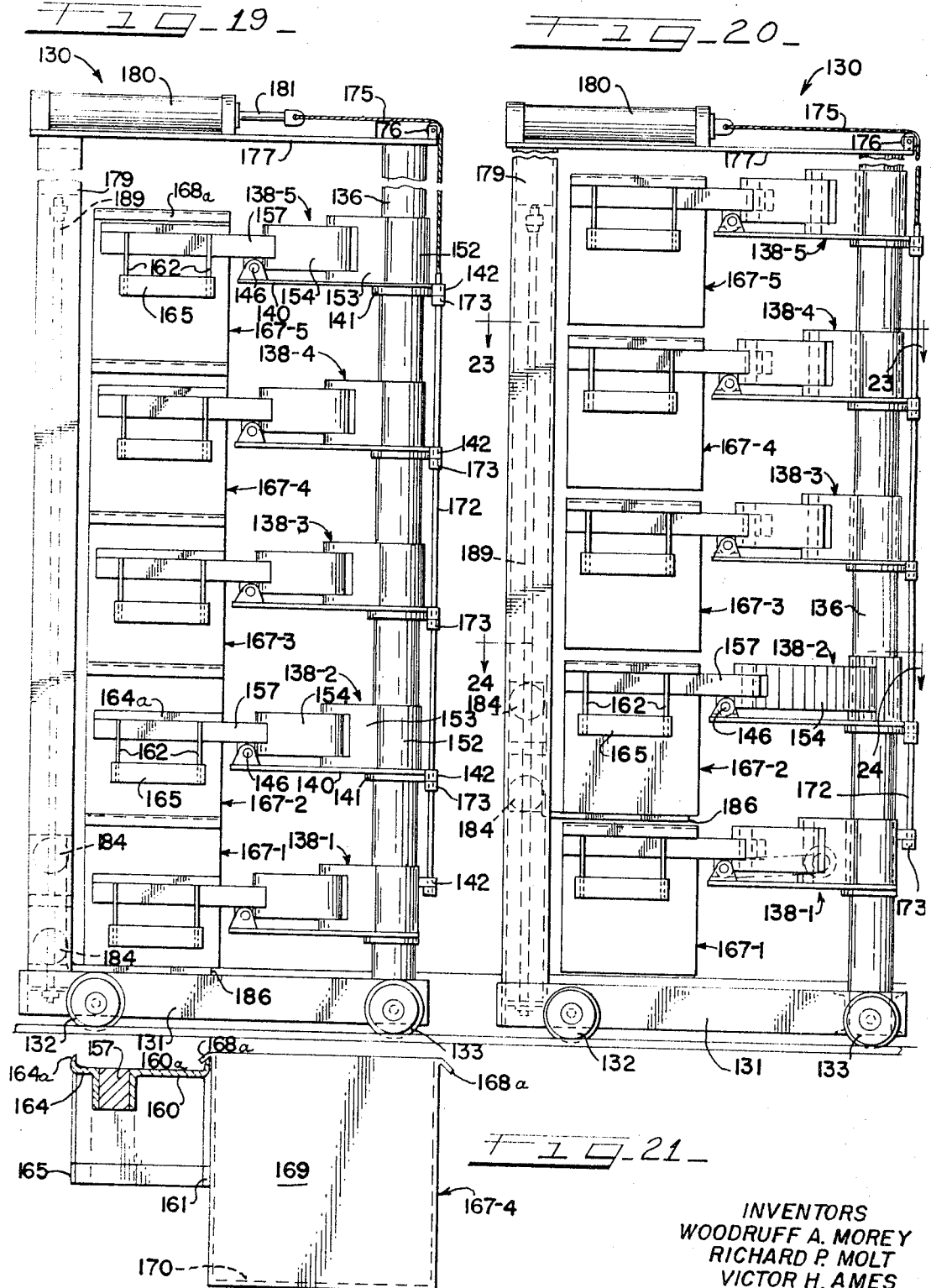

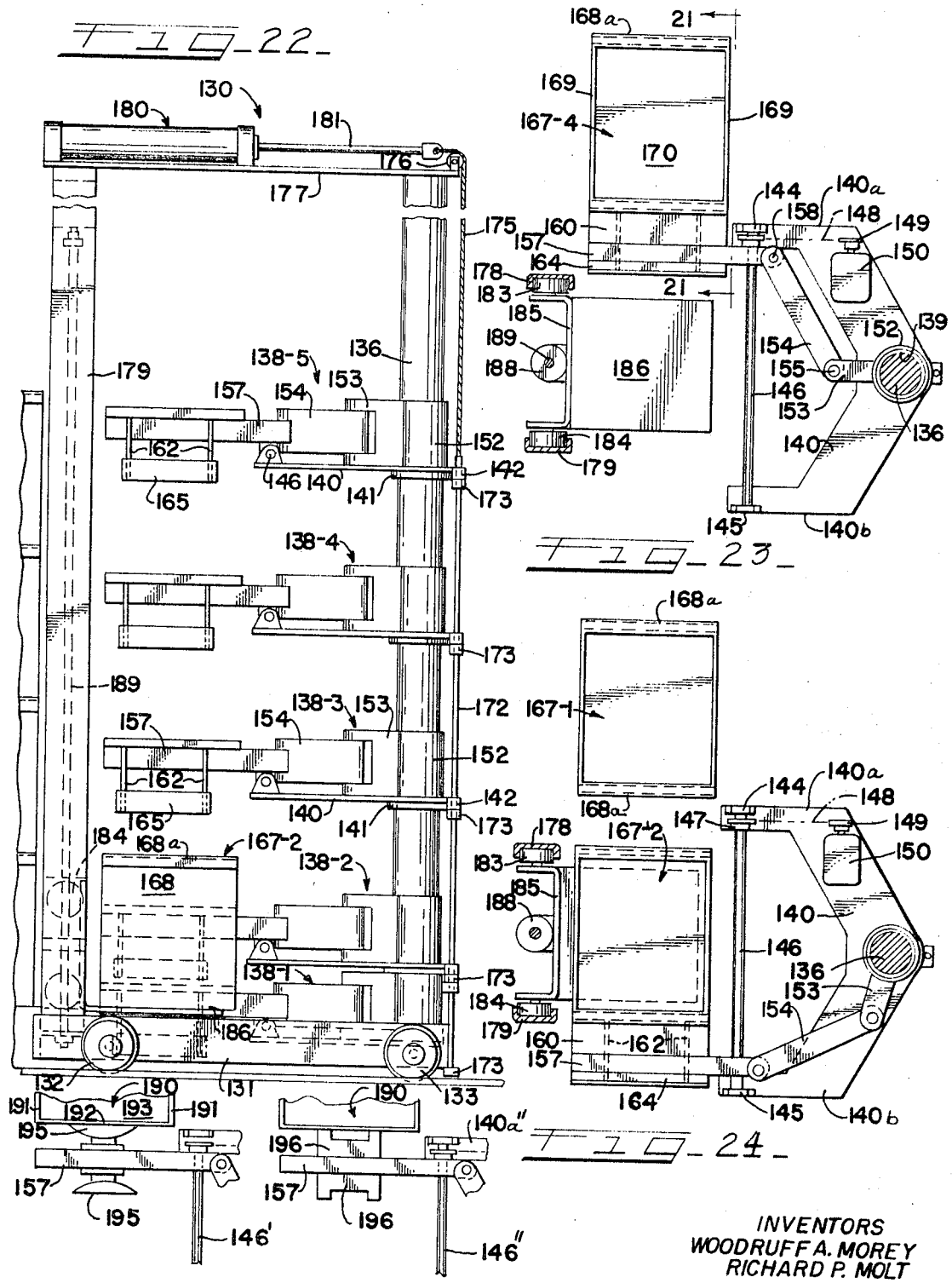

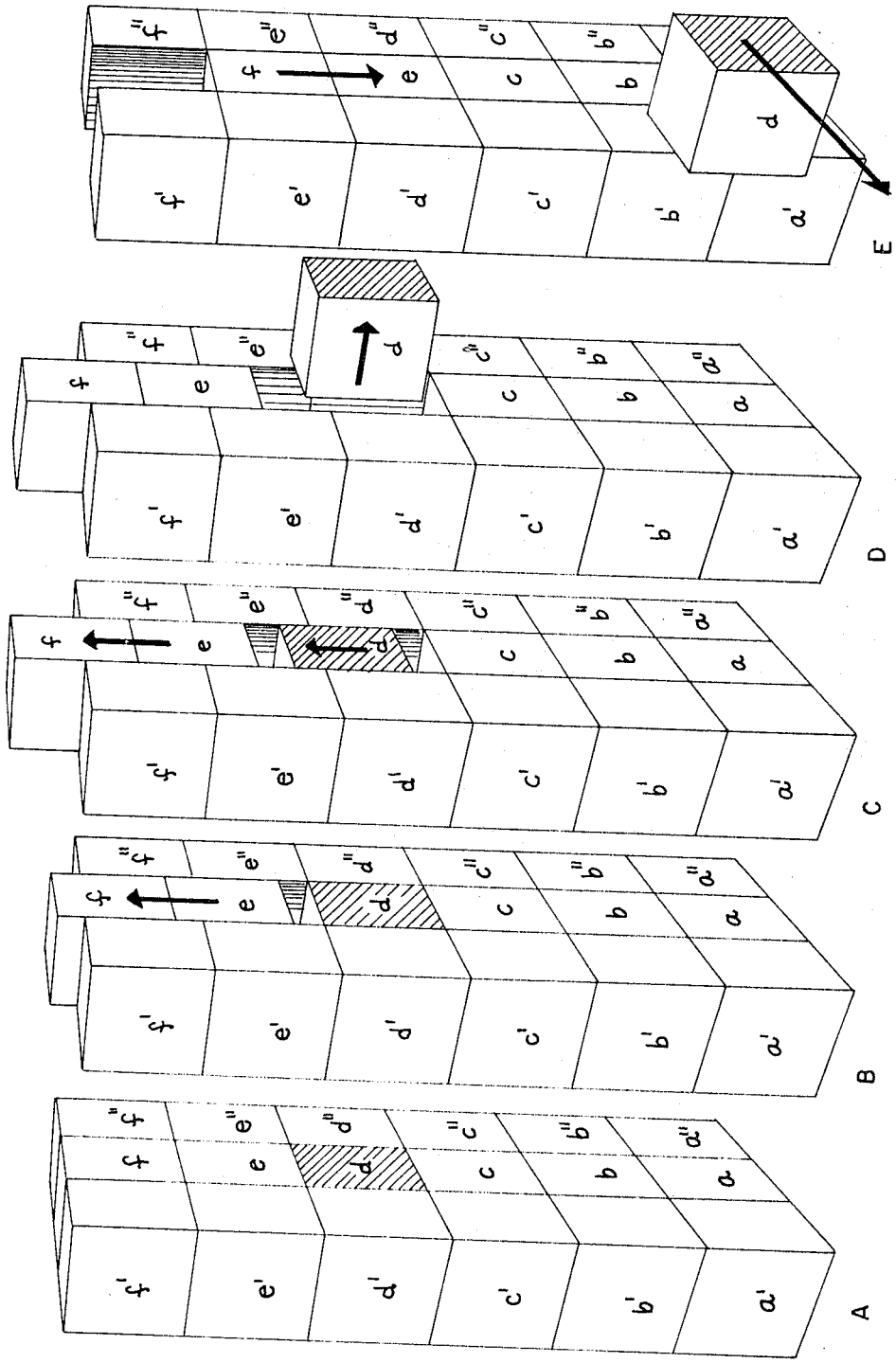

ABSTRACT OF THE DISCLOSURE

A mobile support mounts an upright member or mast supporting a carriage for vertical reciprocal movement. The carriage mounts first and second sets of parallel article engaging forks, each set of forks being horizontally movable relative to the carriage between extended and retracted positions. One set of forks supports an article in the stack and any articles thereabove. The other set of forks moves a selected article horizontally from or to a position beneath the first mentioned article or articles. In another embodiment of the invention, a plurality of carriages are mounted on the mast for differential vertical movement relative thereto. In this embodiment, all articles in the stack are engaged and lifted such that vertical spaces are formed between all adjacent articles; the selected article is moved horizontally to and from a position within the stack.

---

The present invention relates in a general way to handling articles, and more particularly the invention relates to a new and improved apparatus and method for handling articles which are stored in stacks or tiers without the aid of racks.

The storage of articles, such as tote boxes for example, by means of racks is in widespread use. These racks usually consist of vertically spaced, horizontal decks or platforms with appropriately spaced vertical partitions or brace members. This form of storage, although generally acceptable, does not permit a maximum number of articles to be stored within a given space since the racks themselves occupy considerable space and since the racks necessarily provide open spaces above the articles to permit easy storage and removal of the same.

Storage of articles in stacks or tiers without the aid of racks provides the optimum as far as storing a maximum number of articles in a given storage space. However, this form of storage, i.e., so-called rackless storage, has provided problems in retrieving an article so stacked when such article is other than the uppermost article in the stack or tier. In such case, it has been necessary to remove the article or articles above the selected article on a one-at-a-time basis, temporarily locate these other articles on an adjacent supporting surface, such as a floor, while the selected article is retrieved, and then re-stack the other articles again on a one-at-a-time basis. A similar laborious process is involved when it is desired to store an article in a stack or tier at a location other than the uppermost location in the stack. The present invention has to do with a new and improved apparatus and method for handling articles arranged in stacks or tiers, thereby permitting an article to be stored at any desired location in the stack in an expeditious and efficient manner and also permitting efficient and expeditious retrieval of any article in the stack.

A primary object of the present invention is the provision of a new and improved apparatus which includes a mobile support carrying first vertically reciprocal article engaging means adapted to support and lift an article in the stack and any other articles stacked thereabove and also carrying second vertically reciprocal articles engaging means adapted to move a selected article horizontally to and from a position beneath the first mentioned article.

Another object of the present invention is the provision of an apparatus according to the foregoing object having power means for moving said first and second article engaging means independently of each other along parallel lines extending transversely to the direction of movement of the mobile support.

Still another object of the present invention is the provision of an apparatus according to the foregoing objects wherein said article engaging means have respective article engaging surfaces each arranged for supporting engagement with an article adjacent the base thereof, which first and second article engaging means are vertically spaced from each other a distance such that an article supported on the surface of the second article engaging means is clear of the underside of the first article engaging means.

Another object of the present invention is the provision of a new and improved apparatus which includes a mobile support having an upright member supporting first vertically reciprocal article engaging means adapted to support and lift an article in the stack and any other articles stacked thereabove and also supporting second vertically reciprocal article engaging means adapted to support and lift a selected article, which apparatus further includes power means for moving said first and second article engaging means independently of each other between extended and retracted positions along parallel adjacent paths extending transversely of the path of movement of the mobile support.

Still another object of the present invention is the provision of an apparatus according to the foregoing object and further including article engaging pins supported on the outer end of the second article engaging means, which pins are movable between a first position in parallel nested relation within the first article engaging means and a second position beneath the first article engaging means at a right angle to the direction of movement thereof.

Another object of the present invention is the provision of an apparatus according to the foregoing object wherein the mobile support includes a base structure having a horizontally movable platform for shifting an article to or away from a position wherein it is engaged by the second article engaging means in the retracted position thereof.

Another object of the present invention is the provision of a new and improved apparatus which includes a mobile support mounting a plurality of carriages for vertical reciprocal movement thereon, each of which carriages supports article engaging means, which article engaging means are arranged to lift respective articles different distances thereby forming spaces between adjacent articles, each article engaging means being horizontally movable whereby an article supported thereby may be moved to and from the stack, said apparatus further including elevator means for raising and lowering an article to and from any of the article engaging means.

Still another object of the present invention is the provision of an apparatus according to the foregoing object wherein each article engaging means is adapted to cooperate with complementary means on the associated article thereby to support and lift the latter by engaging such article adjacent only one side wall thereof.

Another primary object of the present invention is the provision of a new and improved method for handling stacked articles, which method permits an article to be stored in an expeditious manner in any level in a stack and also permits expeditious retrieval of any article in the stack.

These and other objects and advantages of the invention will become apparent from the following specification disclosing preferred embodiments of the invention which are illustrated in the accompanying drawings wherein:

FIG. 1 is an isometric view of one embodiment of the present invention;

FIG. 2 is a side elevational view of the FIG. 1 apparatus showing the same located adjacent a stack of articles;

FIG. 3 is an end elevation of the FIG. 1 apparatus showing the same in an aisle between stacks of articles;

FIG. 4 is an enlarged, fragmentary side view, partially in elevation and partially in section, of the FIG. 1 apparatus showing the carriage thereof at its uppermost position;

FIG. 5 is a view taken along the line 5—5 of FIG. 4 and showing the apparatus supporting an article;

FIG. 6 is a side elevational view of another embodiment of the invention;

FIG. 7 is a top plan view of the FIG. 6 apparatus;

FIG. 8 is an enlarged, fragmentary view primarily showing the carriage of the FIG. 6 apparatus;

FIG. 9 is an enlarged view taken along the line 9—9 of FIG. 6;

FIG. 10 is a view similar to FIG. 9 and showing the apparatus after successive operations thereof have occurred;

FIG. 11 is a side elevational view of still another embodiment of the invention;

FIGS. 12 and 13 are similar to FIG. 11 and show successive operations when retrieving the lowermost article in a stack;

FIG. 14 is a section taken along the line 14—14 of FIG. 17;

FIG. 15 is a top plan view of the FIG. 11 embodiment of the invention;

FIG. 16 is a front elevational view of the FIG. 11 embodiment;

FIG. 17 is an enlarged section taken along the line 17—17 of FIG. 15;

FIG. 18 is a view taken along the line 18—18 of FIG. 17 but showing certain members in positions different from the positions they occupy in FIG. 17;

FIG. 19 is a side elevation of a further embodiment of the present invention;

FIG. 20 is also a side elevation of the FIG. 19 embodiment showing the same after it has lifted articlese in a stack to form spaces between adjacent articles;

FIG. 21 is an enlarged section taken along the line 21—21 of FIG. 23;

FIG. 22 is a side elevational view of the FIG. 19 embodiment showing the carriages thereof lowered to their lowermost positions;

FIG. 23 is a section taken along the line 23—23 of FIG. 20;

FIG. 24 is a section taken along the line 24—24 of FIG. 20;

FIG. 25 is a top plan view of a modified form of article engaging member for the FIG. 19 embodiment of the invention;

FIG. 26 is a top plan view of a further modified form of article engaging member for the FIG. 19 embodiment of the invention; and FIG. 27 consists of diagrammatic views illustrating the sequence of operation in retrieving a selected article from a stack according to the method of the present invention.

Referring now to FIGS. 1–5, one embodiment of the apparatus of the present invention, generally designated 10, includes a mobile base 11 consisting of parallel side frame members 12 and 14 secured in spaced relation by cross members 15 and 16. Parallel frame members 12 and 14 support axles 17 and 18 mounting respective pairs of rail wheels 19 and 20. Rail wheels 19 and 20 are supported on a section of track including rails 22 and 23. The apparatus 10 is preferably self-propelled. To this end, the axle 18 is driven by a suitable motor 24. It will be understood that wheels 19 and 20 need not be rail wheels; they may be ground or surface engaging tires, for example.

Brace members 15 and 16 of the base 11 support a pair of parallel upright members 26 and 27, which members are wide flange structural members secured in spaced relation at their upper ends by a horizontally disposed channel 28 having the flanges thereof downwardly disposed. A carriage, generally designated 30, is mounted by the upright members 26, 27 for vertical reciprocal movement therealong by means of sets of rollers 31, 32 carried by parallel, spaced side members 33, 34 of the carriage. The set of rollers 31 consists of two pairs of such rollers, which pairs of rollers are engaged in a pair of tracks 35 carried by the upright member 26. In like manner, the set of rollers 32 consists of two pairs of such rollers received in a pair of tracks 36 carried by the upright member 27.

The apparatus 10 carries a power unit 38 for raising and lowering the carriage 30. The power unit 38 includes suitable drive means (not shown) connected with chains 39 and 40 (FIG. 2) which are trained over respective sprocket wheels 41, 42 mounted at the top of upright members 26 and 27. Chains 39 and 40 are connected to the carriage 30 adjacent respective sides of the latter. It will be understood that suitable control means (not shown) are associated with the power unit 38 for raising and lowering the carriage 30 and for stopping the same at any desired elevation.

The carriage 30 includes upper cross members 44 and lower cross members 45 extending between the side wall members 33, 34. The carriage mounts first article engaging means including a pair of main arms 46 slidably mounting respective auxiliary arms 47. The auxiliary arms 47 have a channel-like cross sectional shape (FIG. 5) and are slidably received in correspondingly shaped grooves in the main arms 46. The main arms are slidably mounted in suitable guideways defined by plates 48, 49 and 50 of the carriage 30. The arms 46, 47 are mounted for reciprocal movement between retracted and extended positions along horizontal lines perpendicular to the direction of movement of the base 11. Each arm 46 is reciprocated by a small motor 52 which drives a gear 53 in engagement with a linear series of gear teeth 46a formed in the arm 46. Suitable means (not shown) are provided for advancing the arms 47 relative to the arms 46 as the latter are being extended. When the arms 46, 47 are in their retracted position, they are disposed within the carriage 30 so as not to interfere with movement of the apparatus 10 along an aisle between stacks or tiers of articles (see FIG. 3). When the arms 46, 47 are extended (they may be extended from either side of the carriage), they are cantilevered from the carriage for supporting and lifting engagement with an article in a manner to be described hereinbelow.

The carriage 30 mounts second article engaging means consisting of an arm 55 including oppositely facing grooves which receive respective sets of rollers 56 mounted by carriage frame plates 50. A secondary arm 57 is carried by the arm 55 for relative movement thereto during extension of the arm 55. The secondary arm 57 is supported from opposite pairs of rollers 58, which rollers are received in opposed grooves formed in the arm 55. The arm 55 is reciprocated by a gear 59 (FIG. 4) which engages a linear series of teeth 60 formed on the arm 55. Suitable means, such as a hydraulic motor (not shown), is provided to advance the arm 57 relative to the arm 55 during extending movement of the latter.

The arms 55, 57 are more or less nested within the arms 46, 47 and are arranged for reciprocal movement between extended and retracted positions along lines parallel with the lines of movement of the latter. When the arms 55, 57 are in their retracted position, they are also disposed within the carriage 30 so as not to interfere with movement of the apparatus along an aisle between stacks of articles. The arms 55, 57 are adapted to be extended approximately the same distance as the arms 46, 47. A separate motor and control means therefor (not shown) are provided for driving the gear 59 thereby to permit the arms 55, 57 to be extended and retracted independently of the arms 46, 47.

The arm 57 supports a housing 61 adjacent the outer end of the latter. This housing is disposed transversely of the arm 57 and mounts a pair of pins 62 for reciprocal movement along a common horizontal axis. The housing 61 contains appropriate power means (not shown) for extending and retracting the pins 62 for engagement with an article as will be explained hereinbelow. It will be understood that suitable control means (not shown), preferably mounted on an operator's console on the base 11 of the apparatus, are provided for raising and lowering the carriage, operating the various arms and extending and retracting the pins 62.

The embodiment of the invention just described is especially adapted for handling articles in the form of tote boxes, best illustrated in FIGS. 2 and 3. Each tote box 65 includes side walls 66, front and rear walls 67 and a bottom 68. It will be noted that the side walls 66 extend beneath the bottom 68 thereby defining legs. The tote box 65 further includes hairpin-like members 69 mounted one on each of the side walls 66. Each hairpin includes a loop portion 69a extending above the upper edge of the associated side wall. As noted in FIG. 2, the loop portions 69a are bent outwardly. A tote box 65 is stacked on another tote box by engagement of the bottom edges of the side walls (legs) 66 of the former with the upper edges of the side walls of the latter. The upwardly extending loop portions 69a prevent lateral movement between the stacked tote boxes.

A typical storage arrangement for the tote boxes 65 is shown in FIGS. 2 and 3. The rails 22, 23 are supported on the lower flanges of confronting, spaced structural members 71, 72, which members define an aisle for the apparatus 10. The structural framework on the right side of the aisle as viewed in FIG. 3 will now be described. It will be understood that the arrangement of the tote boxes and supporting structure therefor on the left side of the aisle may be the same. Also, it will be understood that the various arms carried by the carriage 30 are adapted for movement to extend positions to either side of the carriage thereby to handle articles on both sides of the aisle.

Structural members 72 forms part of a structural framework including a channel 73, which channel cooperates with the member 72 for supporting a tote box 65-1. The structural framework also includes upright structural members 74 which support a plurality of inverted T-members 75 in horizontal, parallel spaced relation. As seen in FIG. 2, the T-members 75 serve to support the lowermost tote box 65-2 in a stack of such tote boxes. As will become apparent hereinbelow, the lowermost tote box in the stack of such boxes is supported above the base 11 of the apparatus thereby to permit the lowermost tote box 65-2 to be handled by the embodiment of the invention just described. It will be understood that a plurality of stacks of the tote boxes are supported by the members 75 thereby forming tiers of the boxes 65.

The operation of the FIGS. 1–5 embodiment of the invention is as follows: Assume that it is desired to retrieve tote box 65-3 which is located as the third from the bottom box in a stack of five of such boxes. The apparatus 10 is run along the aisle until the same is positioned opposite the stack of boxes containing the selected box 65-3. The carriage is elevated (all arms thereof will be in the retracted position during this stage of operation) until the upper surfaces of the arms 46, 47 are at an elevation just slightly below the bottom of box 65-4. The arms 46, 47 are then advanced to their extended position where they are disposed beneath the base of the box 65-4, whereupon continued raising of the carriage results in separation of the box 65-4 from the selected box 65-3. Any box or boxes resting on the box 65-4 are also of course moved upward during lifting of the latter.

The arms 55, 57 are extended into the open space above the selected box 65-3 thereby bringing the pins 62 into alignment with the loops 69a on the selected box. Actually, after the box 65-4 is engaged by the arms 46, 47, the carriage is raised to a level such that the pins 62 will be in horizontal alignment with the loops 69a upon extending of the arms 55, 57. The pins 62 are then extended into lifting engagement with the loops 69a, whereupon continued raising of the carriage 30 results in separation of the selected box 65-3 from the box 65-5 therebeneath. At this stage of operation, the various parts are arranged as illustrated in FIG. 3.

The arms 55, 57 are retracted whereby the selected box 65-3 is withdrawn from the stack and into the space in the carriage 30 defined by side walls 33, 34 and upper and lower members 44, 45. Now the carriage is lowered until the box 65-4 is brought to rest on box 65-5, whereupon the arms 46, 47 are retracted into the carriage 30. The carriage 30 is then completely lowered. Now the apparatus 10 is run along the track in a direction along and adjacent the face of the stacks to a location wherein the selected box 65-3 may be removed from the apparatus. The selected box can be removed by means of an ordinary fork lift truck for example, or the arms 55, 57 can be extended to drop the selected box on the bed of a truck or pallet for example.

It is believed to be readily apparent that the apparatus just described can also be used to store a box at any desired location in a stack. In such an operation, the selected box is suspended within the carriage by the pins 62. The apparatus is then advanced along the rails to the stack which is to receive the selected box. The carriage is raised and the arms 47, 46 are extended to be brought into engagement with the base of the tote box which is to rest on the selected box. The carriage is then raised for forming a space in the stack to receive the selected box, whereupon extension of the arms 55, 57 results in movement of the selected box into the space formed in the stack. The boxes are lowered to reform the stack and the various arms are then retracted.

It will be apparent that since the lowermost box 65-2 in the stack is supported in vertical spaced relation from the base 11 of the apparatus by the members 75, such lowermost box 65-2 can be handled in the same manner as described above in connection with the selected box 65-3. If the lowermost box in the stack is not so elevated relative to the base 11, it would not be possible to lower the stack after retrieval of the lowermost box therefrom. Box 65-1, which is really not a part of the stack, can be readily handled merely by extending and retracting the arms 55, 57 and the pins 62 carried thereby.

Another embodiment of the apparatus of this invention is illustrated in FIGS. 6–10. This embodiment is similar in construction to the embodiment described above and operates in the same manner as the latter in storing an article in a stack and in retrieving an article therefrom. The primary difference in the FIGS. 6–10 embodiment is that the same is adapted to handle articles which are not of special construction (such as the tote boxes 65 described above) and which are ordinarily lifted by being engaged at their bases. Another difference resides in the form of the mobile base; the FIGS. 6–10 embodiment is shown mounted on a truck of the fork lift type. It will be understood that the fork lift truck is shown only for the purpose of illustrating another type of mobile support for the article handling apparatus.

The embodiment of the apparatus of this invention illustrated in FIGS. 6–10, generally designated 78, is mounted on a self-propelled truck 80 which supports a vertical mast or upright member 81. The truck 80 is similar in many respects to a fork lift type truck. A box-like carriage 82 is mounted on the mast 81 for vertical reciprocal movement thereto. The details for mounting the carriage 82 on the mast 81 are not described herein as such details can take many different forms as is known to those having ordinary skill in the art.

The carriage 82 mounts first article engaging means consisting of a first pair of arms 46' and respective auxiliary arms 47' slidably mounted thereon (FIG. 8). The arms 46', 47' may be the same in construction and operation as the arms 46, 47 of the FIG. 1 embodiment and are accordingly designated by the prime form of numeral. The carriage 82 mounts second article engaging means consisting of arms 46" and respective auxiliary arms 47". The arms 46", 47" are the same in construction and operation as the arms 46', 47'.

It will be noted that the carriage 82 mounts the various arms for movement in directions at right angles to the direction of movement of the truck 80. Opposite sides of the carriage are open and the arms carried thereby are adapted to be extended from either side of the carriage thereby to adapt the apparatus to handle articles in stacks on both sides of an aisle along which the truck 80 passes. The arms 46', 47' are vertically spaced from the arms 46", 47" so that an article may be supported therebetween and withdrawn into the space defined by the carriage 82. It will be understood that the truck 80 carries suitable power means and controls therefor for raising and lowering the carriage 82 and for extending and retracting the upper and lower sets of arms independently of each other.

The apparatus 78 is adapted to handle articles 85 best seen in FIGS. 6 and 9. Each article 85 includes side walls 86, front and rear walls 87 and a bottom 88. The side walls 86 extend below the bottom 88 and define legs for the box 85. The box 85 is stacked on another like box by resting the legs of the former on the top of the latter. Box 85, which is preferably open at the top thereof, includes a suitable marginal rim or ledge (not shown) to form a supporting surface for the legs of the box 85 stacked thereabove.

FIG. 6 shows a stack of three boxes 85, 85–1 and 85–2 supported by a pair of horizontal, spaced plates 90 mounted on respective upright members 91. The upright members 91 also mount plates 92 for supporting a box 85–3 beneath the stack. It will be noted that the box 85–3 is not actually part of the stack of boxes just described. It will be understood that usually a number of such stacks and supporting means therefor are arranged along opposite sides of aisles in a storage area.

The operation of the apparatus 78 should be readily apparent from the foregoing description of the operation of the apparatus 10. FIGS. 6, 9 and 10 illustrate the apparatus retrieving article 85 from the stack 85, 85–1 and 85–2. The truck 80 is driven along the aisle until the carriage 82 is positioned opposite the stack containing the box 85. The carriage 82 is elevated until the arms 46', 47' are horizontally aligned with the space between the top of article 85 and the bottom of article 85–1. The arms 46', 47' are then extended into this space. When the arms 46', 47' are disposed within the space just described, the article engaging surfaces of the arms 46", 47" are spaced slightly below the base of article 85. The carriage is raised as necessary to align the arms 46", 47" with the space beneath article 85. Such raising of the carriage causes lifting of articles 85–1 and 85–2 by the arms 46', 47'. Next, arms 46", 47" are extended into a position beneath the base 88 of the article 85. The carriage is then raised to bring the article engaging surfaces of the arms 46", 47" into lifting and supporting engagement with the bottom 88 of the article 85. At the same time, this further vertical movement of the carriage causes further separation of the article 85–1 from the article 85 (see FIG. 9). Next, the arms 46", 47" are retracted for withdrawing the article 85 into the space in the carriage 82. Now, the carriage is lowered until the legs of the article 85–1 are brought to rest on the supporting plates 90, whereupon the arms 46', 47' are retracted. The truck 80 is then driven to transport the article 85 (FIG. 8) to a desired location wherein the same will be removed from the carriage 82.

The operation of the apparatus 78 in storing an article at any desired location in the stack should be readily apparent in view of the foregoing description of the corresponding operation of the apparatus 10; accordingly, a description of the operation of the apparatus 78 in storing an article in the stack will not be described herein.

It will be understood that the stand consisting of the members 90, 91 serves to permit handling of the lowermost article 85 in the stack in the same manner as the supporting stands 74, 75 described above. It will be apparent that the article 85–3 may be stored on the plates 92 or retrieved therefrom merely by lowering the carriage 82 and by operating only the arms 46", 47".

Still another embodiment of the apparatus of this invention is illustrated in FIGS. 11–18, inclusive. This embodiment is adapted for handling articles in the form of the tote boxes 65 described above. The main difference between the FIGS. 11–18 embodiment and the embodiment of FIGS. 1–5 resides in the former's capability to handle the lowermost article in a stack, which lowermost article rests on the same horizontal surface or floor which supports the mobile base of the apparatus.

The FIGS. 11–18 embodiment, generally designated 95, includes a truck 96 of the fork lift type, which truck supports an upright member or mast 97. The truck 96 may include suitable outriggers (not shown) to prevent tipping of the apparatus. (The other embodiments of the apparatus of this invention may also include outriggers as desired.) A carriage 98 is mounted just forwardly of the mast 97 for vertical reciprocal movement therealong by means of a housing 99 connected with the carriage and supported on the mast 97 by a plurality of rollers 100. The details of mounting the carriage on the upright member are not described herein as they may take various forms all within the knowledge of those skilled in the art.

The carriage 98 mounts first article engaging means consisting of a pair of spaced parallel arms 102 slidably supported in respective guideways 103 (FIG. 18) formed in the carriage. The arms 102 are not described in detail; they may take the form of main arms and relatively slidable auxiliary arms, such as the arms 46, 47 rescribed above. It will be understood that the carriage 98 mounts the arms 102 for horizontal reciprocal movement between a retracted position within the carriage and an extended position on each side of the carriage.

Carriage 98 mounts a pair of hydraulic rams 105 in parallel vertically oriented relation. The piston rods of these rams are connected to a channel member 106 thereby supporting the latter for vertical reciprocal movement relative to the carriage in a space 107 which is open at the bottom of the carriage and also open at opposite sides thereof. Member 106 mounts three rollers 107 and three rollers 108 in opposing relation with the first mentioned rollers. The rollers 107, 108 are received within grooves of an arm member 109 thereby mounting the same for horizontal reciprocal movement between a retracted position within the carriage and an extended position to each side thereof. Arm 109 includes confronting recesses respectively receiving a plurality of rollers 110 and the same number of oppositely disposed rollers 111, which rollers mount an auxiliary arm 112 for horizontal reciprocal movement relative to the arm 109. Suitable means (not shown) are provided for moving the auxiliary arm 112 relative to the arm 109 as the latter is extended to either side of the carriage 98.

Arm 112 mounts a pin 114, the lower end of which pin extends beneath the arm 112 and rotatably mounts an elongated housing 116 intermediate the ends thereof. The housing 116 supports a pair of pins 117 for movement between extended and retracted positions in the manner of the pins 62 mentioned above in the description of the FIGS. 1-5 embodiment.

A crank arm 118 (FIG. 14) is fixed to the pin 114 for rotating the latter and the housing 116. The arm 118 is swung by means of a hydraulic ram 120 having the piston rod thereof pivotally connected to the arm 118. The cylinder of the hydraulic ram is pivotally connected to a bracket 121, which bracket is mounted from the arm 112. Operation of the ram 120 serves to swing the housing 116 back and forth between a first position in parallel relation with the arms 109, 112 and a second position at a right angle thereto.

The second article engaging assembly consisting of the arms 109, 112 and pins 117 is shown in FIG. 17 in its raised position relative to the carriage. In this position, the housing 116 supported by the arms 109, 112 is disposed in parallel relation with the latter thereby to be fitted within the carriage space 107. It will be noted that in this position the housing 116 is nested between the arms 102 so as not to interfere with lowering of the latter. The arms 109, 112 are shown in their lowermost position in FIG. 12 (also in phantom lines in FIG. 17), lowering of these arms being accomplished by extending the piston rods associated with the hydraulic rams 105.

Truck 96 mounts one end of a horizontally disposed framework assembly 124. The other end of this assembly is supported by suitable casters, skids or runners 125 which engage the same supporting surface for the truck 96. The framework 124 supports a platform 126 (FIG. 13) for horizontal reciprocal movement along a path parallel with the path of movement of the vehicle 96. The platform 126 is reciprocal between a first position wherein it is disposed beneath the carriage 98 and a second position wherein it serves to move an article from beneath the carriage 98.

It will be understood that the framework 124 and the platform 126 supported thereby form a part of the vehicle 96 and are thereby moved with the latter. It will be further understood that the vehicle 96 includes power means and appropriate control means for raising and lowering the carriage 98, extending and retracting the first article engaging arms and the second article engaging arms independently of each other, operating the hydraulic rams 105 and 120, and imparting horizontal reciprocal movement of the platform 126.

The operation of the apparatus 95 is as follows: Referring to FIG. 11, assume that tote boxes 65-6 through 65-10 are stacked one on top of the other, and assume further that it is desired to retrieve the lowermost tote box 65-6. It will be noted that the lowermost tote box 65-6 rests on the same surface which supports the vehicle 96, namely the floor of the storage area. Or in other words, the lowermost article in the stack is not supported above the base of the article handling apparatus as in the embodiments described above. It will be understood that there are a number of such stacks on each side of an aisle along which the vehicle 96 runs. The vehicle 96 is driven until the carriage 98 is located opposite the stack of tote boxes (FIG. 15). Assume that all arms are retracted within the carriage, that the arms 109, 112 are in their uppermost positions relative to the carriage, and that the housing 116 is in parallel relation with the various arms. When the various parts are arranged as just described, they occupy the solid line positions in FIG. 17.

The carriage 98 is raised or lowered, as the case may be, until arms 102 are at a level for being extended into the space defined by the bottom 68 of article 65-7 and the upper edges of the article 65-6. With the carriage so disposed, the arms 102 are extended into this space, whereupon upward movement of the carriage results in lifting engagement of the arms 102 with the base of the article 65-7 thereby lifting the same and the other articles stacked thereabove. The carriage 98 is lifted to form a space between the article 65-6 and 65-7 sufficient to receive the arms 109, 112 and the member 116 supported thereby.

After the carriage has been raised as just described, hydraulic rams 105 are actuated for lowering the arms 109, 112 to their lowermost position wherein they may be extended beneath the base 68 of the article 65-7 supported by the arms 102. After the arms 109, 112 are fully extended, the hydraulic ram 120 is actuated for swinging the member 116 through 90° (to the phantom line position shown in FIGS. 14 and 17). The pins 117 will now be aligned with the lifting loops 69a of the article 65-6. The pins 117 are extended so as to be received within the loops 69a of the article 65-6. Now, further raising of the carriage will result in lifting of the article 65-6 from the floor or supporting surface. Of course, this further upward movement of the carriage 98 also causes the stack of articles 65-7 through 65-10 to be lifted a corresponding distance.

Next, the arms 109, 112 are retracted for withdrawing the article 65-6 from beneath the stack of articles and for positioning the former over the platform 126. The carriage is then lowered slightly to allow the article 65-6 to rest on the platform 126. Pins 117 are retracted and the platform is then moved to transfer the article 65-6 to a position wherein it is no longer beneath the carriage 98 (FIG. 13). Now, the ram 120 is actuated for swinging member 116 into parallel relation with the various arms. Next, the rams 105 are actuated for lifting the retracted arms 109, 112 into their uppermost position within the carriage 98.

The cartridge 98 is lowered until the legs of the article 65-7 come to rest on the surface which formerly supported the article 65-6. This lowering movement of the carriage 98 is made possible since the arms 109, 112 and the housing 116 carried thereby are nested within the arms 102. The arms 102 are completely withdrawn within the guideways 103 of the carriage 98 whereupon the vehicle 96 may be driven along the aisle between the stacks of articles for delivering the selected article 65-6 to a desired location.

It should be apparent that the apparatus 95 is capable for retrieving any article in a stack of such articles in an expeditious and efficient manner; it should also be apparent that the apparatus 95 in an equally efficient and expeditious manner is adapted to store an article in any location in a stack of like articles.

A further embodiment of the apparatus of this invention is illustrated in FIGS 19-24, inclusive. This embodiment is especially adapted for handling articles which are configured and stacked in such manner that they can be lifted by being engaged adjacent only one side wall thereof. Necessarily, such articles are of rather lightweight construction and contain material also rather light in weight.

The FIGS. 19-24 embodiment, generally designated 130, includes a base 131 mounting first and second pairs of rail wheels 132 and 133, which wheels are supported on a pair of rails 135. The base may of course be supported by ground engaging tires, for example. The apparatus 130 is preferably self-propelled and to this end the base 131 contains suitable power means (not shown) for driving one or both pairs of the rail wheels.

Base 131 mounts an upright member 136 in the form of a column having a circular cross section. In the embodiment of the invention shown for purposes of illustration, the column 136 supports five separate carriages 138 each having article engaging means associated therewith. Since all such carriages and the associated article engaging means are of identical construction, only one carriage and the associated article engaging means will be described in detail.

Carriage 138 includes a sleeve or collar 139 mounted on the column 136 for slidable movement in either direction therealong. The carriage includes a plate 140 having an aperture for freely receiving the column 136. The plate 140 is secured to the collar 139 at the base thereof and the plate 140 is thereby supported in horizontal relation for vertical reciprocal movement. Secured to the underside of plate 140 is an annular plate 141 freely encircling the column 136; the plate 141 and the plate 140 together mount a collar 142. Suitable means, such as a key and slot for example (not shown), are provided for preventing the sleeve 139 and the plates 140, 141 from rotating in a horizontal plane relative to the column 136.

The plate 140 includes integral arm portions 140a, 140b mounting respective journals 144, 145 supporting opposite ends of a long screw member 146, which member is threaded along substantially the entire length thereof. Screw 146 has a sprocket wheel 147 fixed thereto, which sprocket wheel is engaged by a chain 148 driven by a sprocket wheel 149 from a motor 150 mounted on the plate 140. It will be understood that motor 150 is of the reversible type and is thereby adapted for rotating the screw 146 in either direction. It will be understood that the screw 146 merely rotates in either direction in the journals 144, 145 and does not move axially relative to the same.

A sleeve 152 is mounted on the collar 139 for rotation relative thereto. Sleeve 152 supports a radially extending arm 153 recessed at its outer end for receiving one end of a second arm 154. The arms 153, 154 are pivotally connected to each other by means of a vertically extending pin 155. The other end of arm 154 is recessed and receives one end of a cantilever arm 157. A vertically extending pin 158 pivotally connects arms 154, 157. Arm 157 supports a sleeve (not shown), which sleeve is internally threaded and in threading engagement with the screw 146. It should be apparent that rotation of screw 146 serves to move the arm 157 back and forth between the positions thereof illustrated in FIGS. 23 and 24, dependnig on the direction of rotation of the screw. During this rotation of the screw 146, the arms 153, 154 act to maintain the arm 157 in horizontal relation and in a relation at a right angle with the axis of rotation of the screw 146.

As noted in FIG. 21, arm 157 carries a number of structural plate members including a cantilevered upper plate 160 having an integral, upwardly extending lip 160a extending along a substantial portion of the arm 157 in parallel relation therewith. Arm 157 also supports a vertically disposed plate 161 beneath the lip 160a of the plate 160. Suitable web plates 162 are provided to brace the plate 161 from the arm 157. Arm 157 supports another plate 164 in the manner of a cantilever, which plate has an integral, upwardly extending lip 164a similar to the lip 160a. The arm 157 also supports a vertically extending plate 165 beneath the lip 164a. The web plates 160 serve to brace the plate 165.

As seen in FIGS. 20 and 21, the articles 167 for which the apparatus 130 is adapted to handle are each in the form of a box having front and rear walls 168, side walls 169 and a bottom 170. Each front and rear wall 168 includes an integral, downwardly turned lip 168a. Each of these lips is adapted to be engaged by either of the lips 160a, 164a of the apparatus 130. As noted in FIG. 21, when the lip 160a is in lifting engagement with the lip 168a of the article, the plate 161 is in abutting engagement with the adjacent wall 168 thereby to prevent the article 167 from tipping when being supported from the arm 157.

It will be understood that the lip 164a and the plate 165 support one of the articles 167 in the same manner as the lip 160a and the plate 161. The lips 160a and 164a, and respective plates 161, 165 are offset different distances from the arm 157 by reason of the fact that the arm 157 cannot travel as near the journal 144 as the journal 145 due to the presence of the sprocket wheel 147 on the screw 146 (FIGS. 23 and 24).

A rod 172 extends freely through each of the collars 142 forming part of the associated carriages. Fixed to the rod 172 are a plurality of collars 173 equal in number to the number of collars 142. For a purpose which will be made clear hereinbelow, the vertical spacing between the collars 173 is greater than the vertical spacing of the lips 168a of the articles 167.

The upper end of the rod 172 is connected with a cable 175, which cable is trained over a pulley wheel 176 mounted on a horizontal plate 177. The plate 177 is supported at one of its ends on the column 136 and at its other end on an elevator assembly consisting of channels 178 and 179 (FIGS. 23, 24). Plate 177 mounts a hydraulic ram 180 including a piston rod 181 which is connected with the cable 175. It will be apparent that actuation of the hydraulic ram 180 will cause raising and lowering of the rod 172.

Channels 178, 179, which are mounted at their bases on the base frame 131, receive opposite pairs of rollers 183, 184, which rollers mount a plate member 185 having an integral, horizontal extension of platform 186. The plate 185 mounts a collar 188 which may be engaged with a vertically mounted screw 189 to bring about vertical reciprocal movement of the platform 186. The base 131 of the apparatus includes suitable power means (not shown) for rotating the screw 189 in either direction thereby to raise and lower the platform 186.

It will be understood that appropriate control means are provided for operating the elevator consisting of the platform 186, for actuating the hydraulic ram 180 and for energizing each motor 150 independently of the other electric motors. Such control means may be mounted on the apparatus 130 itself or may be arranged remotely of the apparatus.

Operation of the apparatus 130 in retrieving an article 167 from a stack of such articles will now be described. Assume that it is desired to retrieve article 167–2 from the stack of articles illustrated in FIG. 19. The apparatus is run along the rails 135 until the various article engaging members thereof, in this case the lips 160a and plates 161, are positioned opposite the front walls 168 of the stack including the article 167–2. It will be understood that usually a storage area will include a number of such stacks on each side of the aisle defined by the rails 135.

The vertical positions of the various carriages 138 just prior to lifting the article in the stack are as illustrated in FIG. 19. It will be noted that the lip 160a carried by the uppermost carriage 138 is spaced just slightly beneath the lip 168 of the uppermost article 167–5. It will further be noted that the article engaging lips 160a of the remaining carriages are spaced progressively greater distances from corresponding article lips 168a proceeding from top to bottom of the stack. This results from the fact that the collars 173 on the rod 172 space the various article engaging lips 160a at a uniform spacing but at a spacing greater than the vertical spacing of the lips 168a in a stack of such articles.

The motors 150 are energized, preferably in unison, for moving the arms 157 horizontally until the plates 161 carried thereby are brought into abutting engagement with the front walls of respective articles in the stack. Next, hydraulic ram 180 is actuated for lifting all of the carriages 138 in unison, thereby successively bringing the lips 160a into lifting engagement with the lips 168a of the articles 167–5, 167–4, etc. This upward movement of the carriages results in all articles in the stack being lifted progressively greater distances proceeding from bottom to top of the stack, whereby spaces will be formed between adjacent articles as illustrated in FIG. 20. Since each article is individually supported, lifting each article only by engaging the lip 168a and the wall 168 is made feasible.

Now, motor 150 of the carriage 138–2 is energized for moving the selected article 167–2 horizontally from the position indicated in FIG. 23 to the position shown in FIG. 24. The elevator is next raised until the platform 186 thereof is brought into engagement with the base of the selected article 167–2. Further upward movement of the platform 186 results in disengagement of the lip 168a of the selected article from the lip 160a of the carriage 138–2. Motor 150 of the carriage 138–2 is again energized to move the lip 160a thereof horizontally so the same will not interfere with the lip 168a of the selected article 167–2 upon lowering thereof.

Next, motor 150 of carriage 138–2 is energized for returning the arm 157 to a position at least in approximate vertical alignment with the other arm 157. Now, hydraulic ram 180 is actuated for lowering all of the carriages thereby to stack articles 167–3, 167–4 and 167–5 on article 167–1. The entire apparatus 130 is now moved along the rails 135 for delivering the selected article 167 to a desired location.

During lowering of the carriages to reform the stack as described above, the lowermost carriage 138–2 comes to rest on suitable stop means (not shown) carried by the framework 131 (FIG. 22). Continued lowering of the rod 172 results in the carriage 138–2 coming to rest on the upper end of the collar 139 of the carriage 138–1. The rod 172 can be lowered until the lowermost collar 173 carried thereby is disposed just above the supporting surface for the apparatus 130. This construction permits lowering of the carriages to reform a stack after a selected article has been withdrawn therefrom, regardless of the position of such selected article in the stack.

It should be apparent that the apparatus 130 is adapted to replace the selected article 167–2 in any location in the stack. Assume that the stack consists of articles 167–1, 167–3, 167–4 and 167–5, from bottom to top, and assume it is desired to replace article 167–2 in the stack between articles 167–4 and 167–5. The article 167–2 is placed on the platform 186 and the entire apparatus 130 is driven until the same is positioned along side the stack in question. The arms 157 of all carriages, except carriage 138–4 are moved horizontally until the plates 161 carried thereby are brought into abutting engagement with the walls 168 of respective articles. The lip 160a of the carriage 138–4 is positioned so the same will not come into engagement with the lip 168a of the article 167–4. The hydraulic ram 180 is actuated for lifting all the carriages whereupon articles 167–1, 167–3, 167–4 and 167–5 will be supported in spaced relation by respective carriages 138–1, 138–2, 138–3 and 138–5. This results in a space being formed between articles 167–4 and 167–5 sufficient to receive the selected article 167–2. The elevator is lifted for raising the selected article to an elevation whereby the same can be lifted and supported by the lip 160a of the carriage 138–4. Now, the motor 150 associated with the carriage 138–4 is energized for moving the selected article 167–2 horizontally into the open space in the stack. Next, the ram 180 is energized for lowering all of the carriages 138 in unison thereby to reform the stack with article 167–2 stacked on article 167–4 and beneath article 167–5.

It will be understood that the apparatus 130 is not to be limited to any particular number of carriages. Preferably, the number of carriages on the apparatus will be equal to the maximum number of articles in a stack at any one time.

FIG. 25 shows a modified form of article engaging member for the apparatus 130. This modified form of article engaging member is designed for handling articles of light-weight construction and which contain rather light loads. The parts of the FIG. 25 modification which are identical to the apparatus 130 are indicated by the prime form of numeral.

The articles handled by the FIG. 25 embodiment may simply be boxes 190 consisting of side walls 191, front and rear walls 192 and a base or bottom 193. Such articles are not provided with any form of lifting lip, such as the lip 168a of the articles 167, but present only vertical, planar walls for being engaged by the article engaging members of the article handling apparatus. To this end, the arm 157' supports oppositely disposed suction cups 195 which act as cantilevered article engaging means. The arm 157' is moved horizontally until one of the cups 195 is brought into engagement with wall 192, whereupon vacuumizing of the cup results in the article 190 being supported from the arm 157'. Should the articles 190 be of metallic construction, the article engaging members may include oppositely arranged magnets 196 carried by the arm 157" as illustrated in FIG. 26. The operation of the apparatus employing these modified forms of article engaging members is essentially the same as the operation of the apparatus 130 as explained above.

The present invenion also has to do with a new and improved method for handling stacked articles, which method is carried out in using each of the foregoing embodiments of the apparatus of this invention. The method of this invention will be explained in conjunction with FIG. 27 which shows, in diagrammatic form, the sequence of movements when retrieving an article from a stack of such articles by the method of this invention. However, the method according to the present invention is not to be limited to retrieving an article from the stack as such method also covers storing an article in a stack.

FIG. 27 illustrates the sequence of steps of the method of this invention when using the apparatus embodiments shown in FIGS. 1–18, inclusive. However, as will become apparent herein, the various steps of operation when using the FIGS. 19–26 embodiment are the same as when using the FIGS. 1–18 embodiment, at least as far as the broader aspects of the method are concerned.

Referring now to FIG. 27A, assume that it is desired to retrieve article $d$ from a stack of such articles consisting of articles $a$–$f$, inclusive, which stack is arranged between adjacent stacks $a'$–$f'$ and $a''$–$f''$. The first step includes lifting the articles $e$ and $f$ which are stacked above the selected article $d$; these two articles above the selected article are then temporarily supported in spaced relation from the latter (FIG. 27B). When using the apparatus 10, 78 or 95, only the article $e$ is engaged and therefore this article and the articles stacked thereabove are lifted in unison. When using the apparatus 130, both of the articles $e$ and $f$ are engaged and the latter is lifted a greater distance than the former thereby forming a space between the articles $e$ and $f$ in addition to the space formed between the articles $d$ and $e$. The next step consists of lifting the selected article $d$ to form a space between the latter and the article $c$ therebeneath (FIG. 27C). When this step is performed using the apparatus 10, 78, 95 or 130, the articles $e$ and $f$ are lifted a further distance during this lifting of the article $d$ from the article $c$. When using the apparatus 130, spaces are sequentially formed between articles $c$ and $b$ and also between articles $b$ and $a$ upon continued lifting of the article $d$ and the articles thereabove.

At this stage of retrieving the selected article $d$ according to the method of this invention, it will be noted that the selected article $d$ is in spaced relation from the article $c$ therebeneath and the article $e$ thereabove. The next step consists of withdrawing the selected article $d$ horizontally from the stack (FIG. 27D).

The final step consists of reforming the stack and lowering the selected article $d$ (FIG. 27E). When using either the apparatus 10, 78 or 95, the selected article $d$ is lowered simultaneously with reforming of the stack, i.e., lowering of the articles $e$ and $f$ until the former comes to rest on article $c$. When using the apparatus 130, the selected article *d* is preferably lowered prior to lowering the other articles to reform the stack.

The selected article is then moved horizontally along the aisle, i.e., along a path at a right angle to the horizontal path of movement of the selected article from the stack. In all embodiments of the apparatus shown above, it will be noted that the selected article can be moved along the aisle after it has been withdrawn from the stack a distance approximately the same as its over-all dimension as measured in a direction parallel with its path of movement from the stack. In this respect, it will be observed the aisle between or adjacent the stacks is only slightly wider than the aforementioned dimension of the article. The minimum aisle width is of course determined by such dimension of the articles. The aisle width can be maintained near such minimum as in all embodiments the article engaging members are fully retractable horizontally relative to the apparatus thereby contributing to minimum lateral width thereof.

The sequence of steps used when storing an article in any desired location in the stack, other than the uppermost position in the stack, is essentially the same as the foregoing described steps used in retrieving an article from the stack. When storing an article in the stack, the article or articles stacked above the article upon which the selected article is to be supported are lifted to form a vertical space having a height greater than the height of the selected article to be stored. The articles in the stack are temporarily supported in this relationship, the selected article is elevated to the appropriate height, and then moved horizontally into the space formed in the stack. The stack is then reformed by lowering all of the lifted articles until each article rests on the article therebeneath.

From the foregoing explanations in retrieving an article from the stack and in storing an article in the stack, it will be understood that in its broadest aspects the method of handling articles according to the present invention consists of the steps of: lifting an article in the stack and the article or articles stacked thereabove, if any, thereby at least to form a space in the stack beneath the first mentioned article, temporarily supporting such article or articles in the lifted position, moving a selected article horizontally to or from a position beneath the first mentioned article depending on whether an article is being retrieved from the stack or being stored therein, and then lowering the lifted articles to reform the stack.

While the invention has been shown in but only several forms, it will be obvious to those skilled in the art that the invention is not to be so limited. On the contrary, the invention is susceptible of various forms and modifications. It is to be understood that it is within the spirt and scope of the present invention to operate any of the several embodiments of the apparatus of this invention by computor operated control means in which case the apparatus can be completely operated at a location remote from the apparatus itself.

We claim:

1. An apparatus for handling articles arranged in a stack, said apparatus comprising, a mobile support including at least one upright member, carriage means mounted by said upright member for vertical reciprocal movement relative thereto, means for moving said carriage means vertically, first article engaging means supported by said carriage means for engaging an article in the stack and any other articles stacked thereabove thereby to lift and support the same, said first article engaging means being supported by said carriage means for horizontal movement relative thereto for being extended into and retracted from a position within said stack, means for extending and retracting said first article engaging means, second article engaging means supported by said carriage means for horizontal movement relative thereto between a retracted position and an extended position, said second article engaging means being adapted to engage a selected article thereby to support the same, and means for extending and retracting said second article engaging means whereby the latter serves to move the selected article from and to a position beneath said first mentioned article while said first article engaging means supports the latter and any other articles thereabove, which first and second article engaging means are cantilevered from said carriage means at least in their extended position, said mobile support being movable along a first horizontal direction at a right angle to the direction of movement of said first and second article engaging means relative to the carriage means, movement of said first and second article engaging means to their retracted positions serving to permit said mobile support to move in said first direction along and adjacent the face of the stack.

2. The apparatus according to claim 1 wherein said mobile support comprises a vehicle of the fork lift truck type.

3. The apparatus according to claim 1 further defined by, said carriage means including at least three separate carriages, first and second of said carriages mounting said first and second article engaging means, respectively, third article engaging means mounted by the third carriage for horizontal movement relative thereto for being extended into and retracted from a position within said stack, means for moving said third article engaging means horizontally, which third article engaging means is arranged to engage the article immediately below the selected article, said carriages being arranged so that upon raising of the same said article engaging means lift respective articles different distances thereby forming spaces between adjacent articles, said mobile support further including elevator means for raising and lowering an article to and from any of said article engaging means.

4. The apparatus according to claim 3 in combination with articles of the type having respective side walls contained in a common vertical plane, each of said side walls having a formation adapted to be engaged from the underside thereof for lifting the associated article, said articles being of like construction whereby said formations are uniformly spaced in a vertical direction.

5. The apparatus according to claim 4 further defined by, each article engaging means having a formation shaped for lifting engagement with said formation on the associated article, each of said article engaging means also including a surface thereof arranged for abutting engagement with said side wall of the associated article at a location below said formation of the latter thereby to prevent tipping of the same, means for raising and lowering all of said carriages in unison, the vertical spacing of said apparatus formations being greater than the vertical spacing of said article formations whereby said carriages upon raising thereof cause respective articles to be lifted different distances thereby forming spaces between adjacent articles.

6. The apparatus according to claim 5 wherein the means for raising and lowering said carriages includes a vertically extending, elongated member in engagement with each of said carriages and supporting the latter in spaced relation such that said apparatus formations have a uniform spacing greater than the vertical spacing of said article formations, and power means carried by said mobile support and engaged with said elongated member for raising and lowering the same.

7. The apparatus according to claim 3 in combination with articles of the type having respective side walls contained in a common vertical plane when the articles are arranged in a stack, each of such side walls and each of said article engaging means having complementary interengaging surfaces permitting said article engaging means to support and lift respective articles by engaging the same only adjacent said side walls thereof.

8. The apparatus according to claim 7 wherein said interengaging surfaces are defined by suction cups and planar areas on said article engaging means and said side walls, respectively.

9. The apparatus according to claim 7 wherein said interengaging surfaces are defined by magnets and planar magnetic areas on said article engaging means and said side walls, respectively.

10. The apparatus according to claim 5 wherein each of said apparatus formations comprises a horizontally disposed, upwardly extending lip mounted to be brought into parallel adjacent relation with said side wall of the associated article, each of said power means including linkage connected to the associated lip for moving the same between its extended and retracted positions along a linear path perpendicular to said side wall of the associated article.

11. An apparatus for handling articles arranged in a stack, said apparatus comprising, a mobile support and at least one upright member mounted therefrom, a carriage mounted on said upright member for vertical reciprocal movement therealong, first telescoping arm means supported by said carriage for horizontal reciprocal movement relative thereto along a line at a right angle to the path of movement of the mobile support, said first arm means being movable between a retracted position in vertical alignment with said path and an extended position laterally offset from such path, second telescoping arm means supported from said carriage for horizontal reciprocal movement relative thereto along a line parallel with the first mentioned line for moving at least one article engaging member carried thereby between a retracted position in vertical alignment with said path and an extended position beneath the extended position of said first arm means, means on the carriage for extending and retracting said first and second arm means independently of each other, said first arm means being adapted in the extended position thereof to support an article in the stack and any other articles stacked thereabove, movement of said second arm means between said positions thereof serving to move a selected article to and from a position beneath the first mentioned article.

12. The apparatus according to claim 11 wherein said first and second arm means have respective article engaging members each arranged for supporting engagement with an article adjacent the base thereof, said first and second arm means being vertically spaced from each other a distance such that an article supported on said member of the second arm means is clear of the underside of said first arm means.

13. The apparatus according to claim 11 wherein said second arm means mount at the outer end thereof a unit slidably supporting a pair of article engaging pins which constitute the article engaging members of the second arm means, means carried by said second arm means for moving said pins toward and away from each other along a common horizontal axis.

14. The apparatus according to claim 13 further defined by mounting means for moving said unit vertically back and forth between a first position wherein said pins are at least partially nested within said first arm means in parallel relation therewith and a second position wherein said pins are disposed below said first arm means at a right angle thereto.

15. An apparatus for handling stacked articles wherein each article includes (a) first means adjacent its base adapting the article to be supported therefrom and (b) second means adjacent its upper portion adapting the article to be suspended therefrom, said apparatus comprising, a mobile support including at least one upright member, a carriage mounted by said upright member for vertical reciprocal movement relative thereto, means for moving said carriage vertically, first arm means supported by said carriage for horizontal reciprocal movement relative thereto between a retracted position and an extended position, said first arm means being adapted in said extended position thereof to engage said first means of an article in the stack to lift and support the former and any other articles stacked thereabove, second arm means in parallel adjacent relation with said first arm means and supported by said carriage for horizontal reciprocal movement relative thereto between a retracted position and an extended position, said second arm means being adapted to engage said second means of a selected article thereby to lift and support the latter, and means for extending and retracting said first and second arm means independently of each other whereby said second arm means serves to move said selected article to and from a position beneath the first mentioned article while said first arm means supports the same and any other articles resting thereon, said second arm means serving to raise and lower the selected article from and to a position adjacent the base of the stack upon corresponding movement of the carriage.

16. The apparatus according to claim 15 wherein said mobile support includes a base member having a platform mounted for horizontal reciprocal movement along a line at right angles with said arm means between a first position and a second position, said platform being arranged in said first position thereof to receive the selected article as the latter is lowered by said second arm means in the retracted position thereof, said platform also being arranged so that when the same is moved to said second position with the selected article thereon the latter is in non-interfering relation with lowering movement of said first and second arm means.

17. The apparatus according to claim 15 wherein said first and second arm means are at least partially nested one within the other.

18. An apparatus for handling articles arranged in a stack, wherein each article is in the form of a container including (a) a base, (b) front and rear walls, (c) side walls each having a portion extending below the base, and (d) a lifting formation on each side wall having a portion thereof extending above the upper edge of the associated side wall, which articles are stacked by resting the bottom edges of said side wall portion on the upper edges of the respective side walls of the adjacent article therebeneath, said apparatus comprising, a mobile support including at least one upright member, a carriage mounted by said upright member for vertical reciprocal movement relative thereto, means for moving said carriage vertically, first arm means supported by said carriage for relative horizontal movement between a retracted position and an extended position, said first arm means being adapted in said extended position thereof to extend between said side wall portions of an article in the stack and to engage the base of the same thereby to lift and support the first mentioned article and any other articles stacked thereabove, second arm means supported by said carriage in adjacent parallel relation with said first arm means and for relative horizontal movement between a retracted position and an extended position, said second arm means having an outer end adapted to extend into the area between the lifting formations on a selected article, movable members on said outer end adapted to extend into lifting engagement with both lifting formations of the selected article thereby to suspend the latter from said second arm means, and other means for extending and retracting said first and second arm means independently of each other whereby said second arm means serves to move said selected article from and to a position beneath the first mentioned article while said first arm means supports the latter and any other articles resting thereon, said second arm means serving to raise and lower the selected article from and to a position adjacent the base of the stack upon corresponding movement of said carriage.

19. The apparatus according to claim 18 wherein said movable members comprise a pair of coaxial pins, supporting means therefor, which supporting means slidably mount the pins for axial movement between an outer position wherein the pins extend into lifting engagement with respective lifting formations on the selected article and an inner position wherein the pins are withdrawn from the lifting formations of the selected article.

20. The apparatus according to claim 19 wherein said second arm means is mounted for vertical reciprocal movement relative to said first arm means, said supporting means including means for swinging said pins through 90° in a horizontal plane for moving the same back and forth between a first position parallel with said arm means and a second position transverse to said arm means, whereby said pins may be nested within said first arm means in parallel relation therewith.

References Cited

UNITED STATES PATENTS

| | | | |
|---|---|---|---|
| 2,701,065 | 2/1955 | Bertel | 214—16.1 |
| 2,896,805 | 7/1959 | Rigsby | 214—8.5 X |
| 3,176,866 | 4/1965 | Meister | 214—620 |
| 3,187,917 | 6/1965 | Miller | 214—730 |
| 3,303,944 | 2/1967 | Parsons | 214—8 |

OTHER REFERENCES

German printed application, 1,179,866, October 1964.

GERALD M. FORLENZA, *Primary Examiner.*

ROBERT J. SPAR, *Assistant Examiner.*

U.S. Cl. X.R.

214—16, 621, 730